Figure 1:
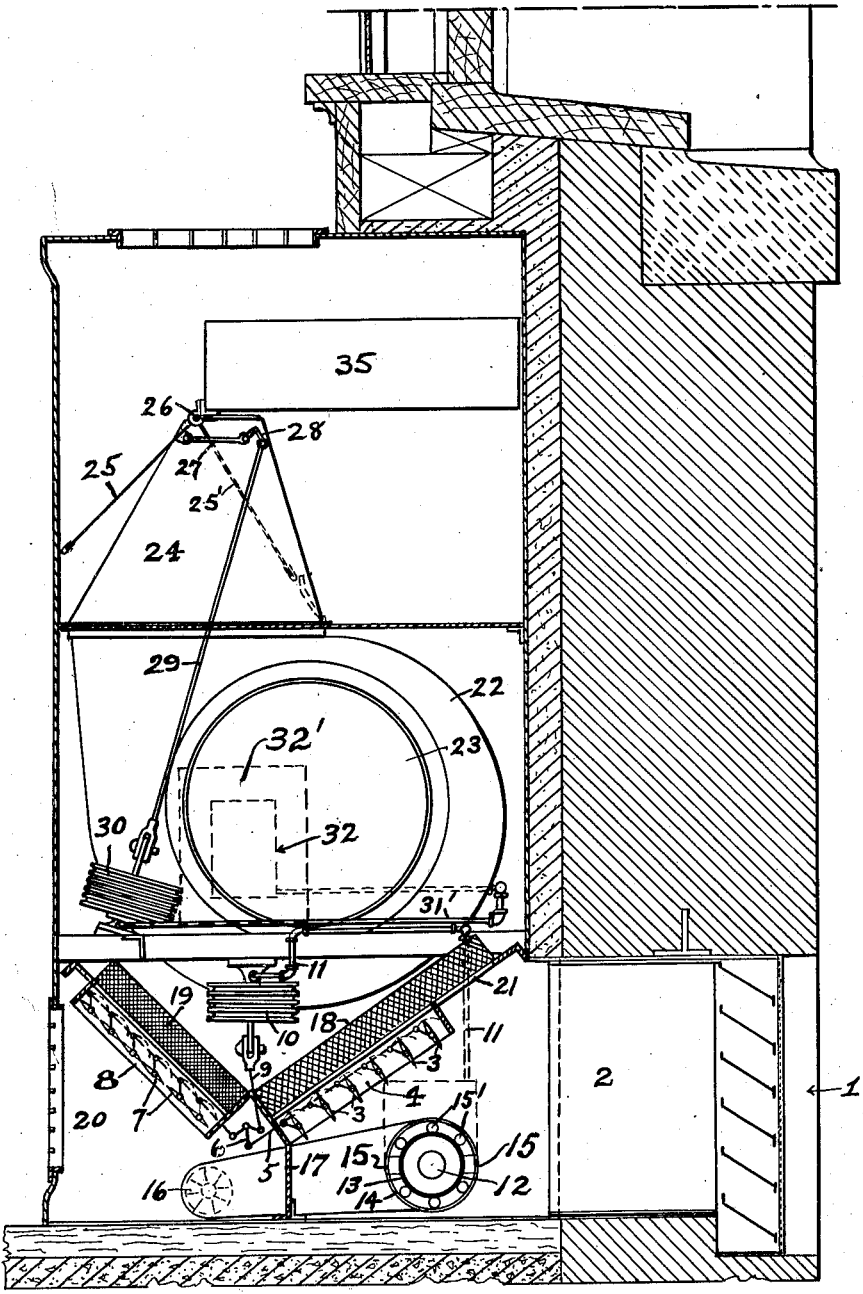

Nov. 14, 1933.  P. WEST  1,935,305
VENTILATING APPARATUS
Filed Jan. 7, 1932   3 Sheets-Sheet 1

INVENTOR,
Perry West,
BY
Lewis J. Doolittle
ATTORNEY.

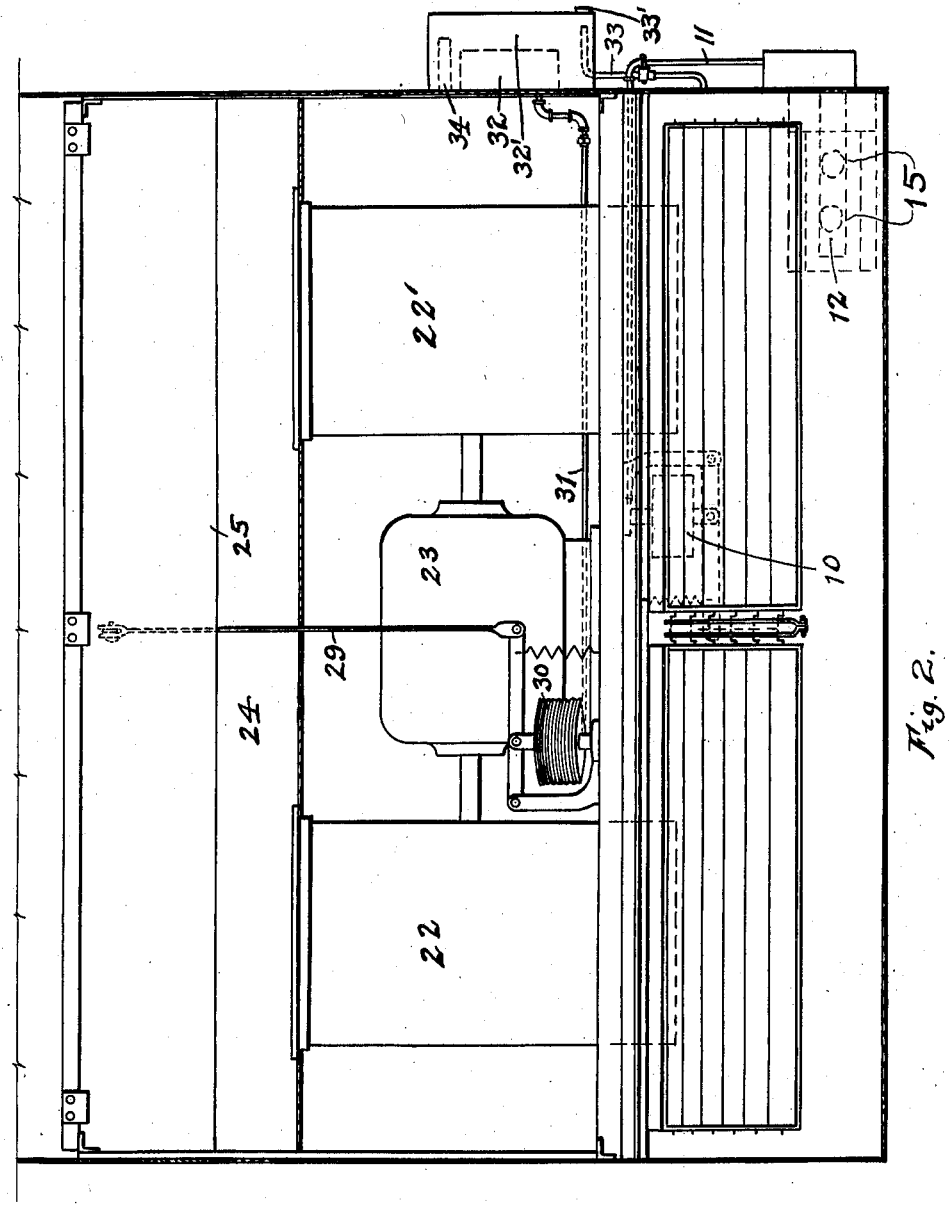

Nov. 14, 1933.   P. WEST   1,935,305
VENTILATING APPARATUS
Filed Jan. 7, 1932   3 Sheets-Sheet 3
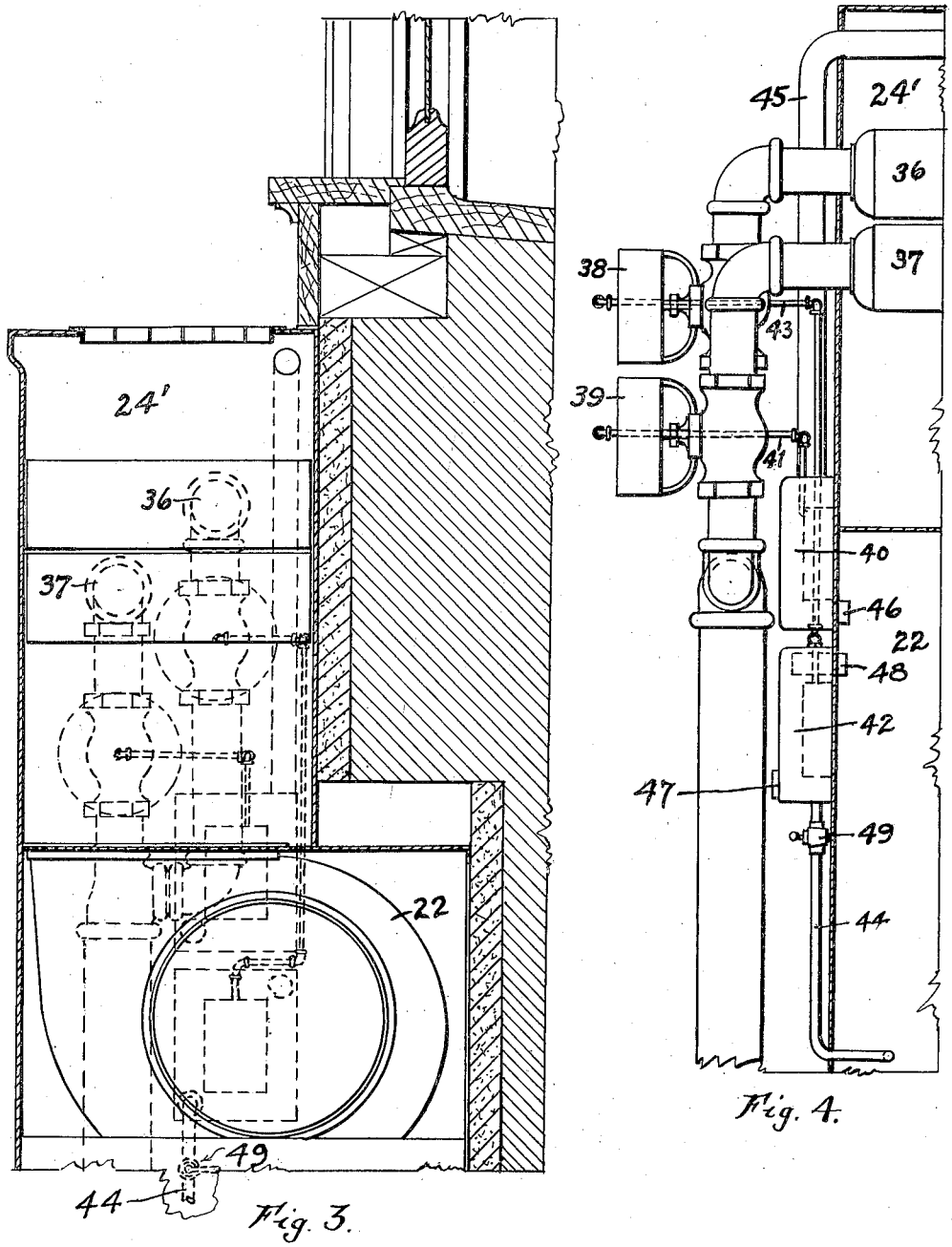
INVENTOR,
Perry West,
BY
Lewis J. Doolittle,
ATTORNEY.

Patented Nov. 14, 1933

1,935,305

UNITED STATES PATENT OFFICE 1,935,305

VENTILATING APPARATUS

Perry West, Newark, N. J.

Application January 7, 1932. Serial No. 585,239

9 Claims. (Cl. 236—38)

The object of this invention is to provide apparatus adapted for use in the heating, ventilating or the heating and ventilating of buildings or other indoor spaces whereby air may be taken in from out of doors and be properly mixed with air from within the building to be heated, ventilated or heated and ventilated.

In ventilating buildings a certain amount of air should be taken in from out of doors but it is generally desirable to limit this amount to a minimum, as it requires heat to warm it in winter or refrigeration to cool it in summer. It is also generally desirable to circulate a certain amount of air within the space to be ventilated, depending upon the character of the space, its human occupancy, its contents, exposure, outside conditions, etc.

Generally speaking, the amount of air desirable to be taken in from out of doors may be much less in cold weather than in mild weather.

This variation in the amount of air to be taken in from out of doors is desirable for three reasons:—For the purpose of saving fuel by heating as little cold air as possible as the weather becomes colder; preventing the air within the space from becoming too dry by not taking in too large a proportion of cold air from outside, for the reason that, generally, the colder the air the less moisture it contains; preventing cold drafts by mixing a large percentage of warm recirculated air from the room with a smaller percentage of cold air from the outside, as the weather becomes colder.

The total quantity of air circulated for any particular space is usually more or less constant. This may be accomplished by taking the entire amount from the outside or only a part and mixing it with the remainder taken from within the room and circulating the mixture.

As the quantity taken in from the outside is varied from 100% in mild weather to a much smaller percentage in coldest weather, the quantity taken from within the space must be varied accordingly to make up the total quantity required to be circulated.

Another fundamental requirement for good heating and ventilating is that the temperature of the air within the space should be increased in proportion as the outside temperature drops. There are two reasons for this, first, that the air within the space usually becomes somewhat drier and, therefore, has a greater cooling effect on the human body, on account of evaporation from the skin; second, that as the exposed walls and glass become colder they cause more radiation of heat from the human body to these colder surfaces.

When the quantity of air taken in from the outside is reduced as the weather becomes colder, the relative humidity within the space may be maintained more or less constant, thus reducing the cooling effect of dry air.

In the proper heating of a space it may also be desirable to limit the quantity of air taken in from the outside as the temperature of the room drops and to increase the same as the temperature rises, so as to assist in the proper regulation of the temperature within the space.

In carrying out the objects of this invention, I have designed a unit heating and ventilating apparatus embodying certain novel ideas and methods for effectively meeting the conditions of proper ventilating and heating of buildings, etc., whereby fresh air may be admitted to the apparatus from out of doors and properly mixed with air admitted from within the building, the proportions of the mixture being automatically controlled as a predetermined function of the temperature of the outside air or as a predetermined function of both the temperature of the outside air and of the temperature of the inside air. Provision is also made for heating and circulating the mixture under automatic temperature control in order to maintain a more or less uniform effective temperature within the building, and whereby the temperature of this said mixture may be automatically controlled and varied so as to maintain within the said building a temperature or temperatures varying as a predetermined function or functions of the temperature of the said inside air or of the said outside air or as a predetermined combined function of the temperatures of the said inside and outside air.

This invention also embodies new and novel ideas and methods in the application of automatic dampers or air volume control apparatus and in the combination of such automatic control apparatus with certain other new and novel apparatus, whereby the action of such automatic control apparatus may be made to act in accordance with any predetermined function of the temperature of the out door air or of the air being taken into the apparatus from out of doors, or in accordance with any predetermined function of the temperature of the air within the building or being taken into the apparatus from within the building or in accordance with any predetermined functions of the combined temperatures of the said outside air and the said inside air.

This invention also embodies new and novel ideas and methods in the application of temperature control apparatus and in the combination of such temperature control apparatus with certain new and novel apparatus, whereby the action of such automatic temperature control apparatus may be made to act in accordance with any predetermined function of the temperature of the out of door air or of the air being taken into the apparatus from out of doors; or in accordance with any predetermined function of the temperature of the air within the building or being taken into the apparatus from within the building or in accordance with any predetermined combined function of the temperatures of the said outside air and the said inside air.

One embodiment illustrative of the invention is shown, more or less in diagrammatic form, in the accompanying drawings, in which like parts of the several views have been given the same reference numeral.

Figure 1A:
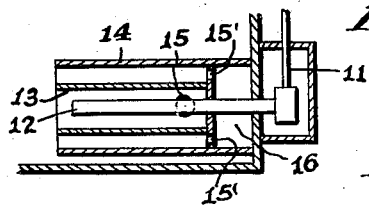

Fig. 1 is an end elevation, partly in section, of the apparatus installed against the inside of the wall of a building; Fig. 1A is a detail sectional view of the thermostatic device controlling the air inlets; Fig. 2 is a side elevation of Fig. 1; Fig. 3 is an end view of the upper part of the apparatus illustrating a modification of the heating arrangement and controls; Fig. 4 is a side elevation of one end of the modification shown in Fig. 3.

The fresh air is admitted through a screen from out of doors at 1 and passes through a passage 2 to the apparatus through dampers 3 controlling the passage 4. These dampers 3 mounted in trunnions and connected by an operating rod 5 to a lever 6. Air is admitted at 20 from the room and passes through a passage 8 controlled by dampers 7, connected to and operated by the lever 6, one set of dampers, such as 3, being in open position when the other set, such as 7, are closed, as shown in Fig. 1.

The lever 6 is operatively connected by means of the link 9 to a motor, indicated at 10. This motor may consist of a metallic bellows or other extensible element arranged to be expanded by compressed air, vapor or liquid pressure, and returned by means of a spring, in the manner well understood in devices of this nature. The pressure is transmitted from a suitable source through a pipe 11 and is controlled by means of a thermostatic element 12, in a manner understood, operating suitable control valves, etc., not shown.

The thermostatic element 12 is surrounded by the tubular members 13 and 14. Tube 13 is closed at one end against the case of the apparatus and open at the other end into chamber 2. Tube 14 is closed at one end against extension chamber 16 except for openings 15' from this chamber into the annular space between tubes 13 and 14 and is open at the other end into chamber 2. Air from the passage 2, from outside, enters the annular space between element 12 and tube 13 through openings 15, which may be provided with suitable adjustable closures, and, also, air from passage 20 from the inside space enters through a damper controlled extension 16 and openings 15' to the annular space between the tubes 13 and 14. Air may thus be circulated from outside of the building through chamber 2, openings 15, annular space between element 12 and tube 13 out through the open end of tube 13, through passages 4 and 21 to fans 22 and 22'. Air may also be thus circulated from the inside of the building through passage 20 and extension 16, openings 15', annular space between tube 13 and 14, and out through the open end of this annular space, through passages 4 and 21 to fans 22 and 22'.

Thus, the action of the thermostatic element 12 is controlled by the combined temperature of the outside air modified by the temperature of the inside air, both of which are adjustably controlled to provide for any desired relative combined effect on the thermostatic element and, in turn, controlling the operation of the motor 10 and the dampers 3 and 7, respectively.

The air passages 2 and 20 are separated by a partition 17 and the air passing therethrough enters the apparatus through suitable filters 18 and 19, respectively.

In addition to the provision for passing the air from the outside through the passage 2 and through the dampers 3 which control the opening 4 to the apparatus from said passage, an auxiliary passage or opening, indicated at 21, may be provided to pass a predetermined constant amount of air from the said passage 2 to the apparatus, regardless of the controlled passage 4. This is desirable in some installations and provides for a certain amount of fresh outside air being admitted at all times.

Fans, indicated at 22 and 22', of the suction type, are operated by a motor 23 and draw the air admitted at the lower part of the apparatus, just described, through to a passage 24 from which it is discharged into the room.

A damper 25 is pivoted at 26 and connected by a link 27 to a lever 28, connected to another link 29 operated by a motor 30, which motor is similar to the motor 10 which operates the dampers in the lower part of the apparatus and which is, in a like manner connected by a pipe 31 to a thermostatic element or device 32, in turn controlled by the temperature of the air admitted through the pipe 33 leading from the outside air passage 2, the pipe 33 being provided with a valve for regulating the amount of air admitted therethrough, as indicated in Fig. 2, and also a second pipe 33', which may also be provided with a valve or damper, admitting air from the room to a tight chamber 32' surrounding the thermostatic element of the thermostat 32 and from which the air is drawn through tube 34 to the fan suction chamber. Air may thus be circulated from within the room through opening 33', chamber 32', around thermostatic device 32 and thence through tube 34 to fans 22 and 22'. Air may also be thus circulated from the outside of the building through chamber 2, tube 33, chamber 32', around thermostatic device 32 and thence through tube 34 to fans 22 and 22'. The operation of the motor 30 is thus controlled by the combined temperature function or action of the mixture of both the outside air and inside air, both of which may be regulated or controlled as desired.

A heating device is indicated at 35 and the damper 25 operates to divert a portion or all of the air through this heating element. When the damper 25 stands in the position indicated in full lines in Fig. 1 all of the air is passed through the heating device 35 but when the same is moved, by the operation of the motor 30, to the dotted position all of the air is by-passed around the heating device. In intermediate positions, the damper diverts a portion of the air through both paths, as will be understood, and, as explained, the operation of the motor 30 is controlled by the thermostatic element 32 which, in turn, is controlled by the temperature of the outside air entering through the passage 2 or by the temperature of the air entering from the room, or by the combined function or action of the temperature of a mixture of both in any desired regulated and adjusted proportion.

Figs. 3 and 4 illustrate a modification wherein the feature of temperature control is illustrated in connection with a variable heating means, supplied with a heating medium such as steam, hot water, etc., for heating the air being supplied to the room. In this part of the device, 36 and 37 are heating elements with inner chambers through which steam or other heating medium may be circulated and over the outside of which the air from the apparatus passes. 38 and 39 are motor valves in the supply pipes to 36 and 37, respectively, for controlling the flow of the heating medium. These valves may be of any of the well known types, such as that equipped with a metallic bellows or a chamber with a flexible diaphragm wherein the valve may be opened or closed by means of compressed air acting to expand the bellows or to move the diaphragms and closed or opened by means of a spring acting to move the parts in the opposite direction. 40 is a thermostatic element, similar to 32 hereinbefore described, and is provided with a tight fitting case and a tube 45 leading from the air discharge chamber 24' into the case and a tube 46 leading to the suction chamber of fan 22. Thus the thermostatic element 40 is affected and operated by the temperature of the mixture in the case of air from the suction chamber before being passed to the heaters and air being discharged into the room after heating.

41 is a tube or other connection for transmitting the air pressure, fluid pressure or electric current, as the case may be, from the thermostatic element 40 to motor valve 39 for properly controlling the opening and closing of this valve in accordance with the temperature changes in the air surrounding the thermostatic element 40. The purpose of this element and motor valve 39 is to control the flow of the heating medium to the heater 37 to prevent the air within the chamber 24' from falling below a predetermined minimum temperature by keeping sufficient heating medium flowing through 37 to maintain such temperature. For this purpose, tube 45 may be extended to a point near the return end of the heater 37 and may be left open at this end so as to take all of its air from such point or the tube 45 may be perforated for a part or all of its length for taking air at various points along chamber 24', for the purpose of guarding against cold drafts being blown through any part of heater 37 without being drawn into tube 45 and thus affecting the control apparatus.

42 is a thermostatic element with a tight case about the same. 47 is an air inlet from the room and 44 is a tube connecting the fresh air inlet 2 with a case enclosing the element 42. 48 is an inlet connecting this case with the suction chamber of fan 22 and 49 is a valve in the tube 44. These parts are similar in construction, arrangement and function to the corresponding parts heretofore described in connection with Figs. 1 and 2. 43 is a connection leading from the thermostatic element 42 to motor valve 38 for controlling the operation of this valve, in a similar manner to that described in connection with motor valve 39, to control the flow of the heating medium to the heater 36 in such a manner as to maintain a temperature within the space being heated as a function of the temperature of the air within said space or as a combined function of the temperature of the air within said space and the temperature of the air out of doors—or being taken into the apparatus from out of doors.

It is to be understood that the reference to the inside of a building, space being heated, room, etc., is illustrative of any enclosed space in which, or in connection with which, the apparatus may be used. Also the reference to the conditioning of the air is illustrative of any treatment, such as heating, cooling, circulating, mixing, etc.

As many changes could be made in the construction and arrangement herein described and many apparently different embodiments of my invention designed without departing from the scope of the appended claims, I intend that all matters contained in the above description or shown in the accompanying drawings shall be interpreted as illustrative merely of an operative embodiment of my invention and not in a limiting sense.

It shall be understood in connection with the following claims that where apparatus of the class described is referred to it shall include apparatus for use in connection with the heating and/or ventilating of, or the conditioning of air for a building, buildings, room, rooms, or other space or spaces to be so heated and/or ventilated by means of air taken into the said apparatus from within the said building, etc., and/or from outside the building and after being heated, cooled or otherwise conditioned delivered to said building by this said apparatus.

Wherever temperature of the air inside is referred to it shall be understood to refer to the temperature of the air inside the building or other space being heated and/or ventilated or to the temperature of the air being taken into the apparatus from the inside of such building, etc.

What I claim is:—

1. The combination in a unit heater and ventilator apparatus of the class described, of means for admitting an automatically controlled amount of outside air to said apparatus, means for passing an automatically controlled amount of air from the interior of the building through said apparatus, means controlled by the combined function of the temperature of the air from the inside and the temperature of the air from the outside of the building for varying the relative amounts of air admitted to and passing through said apparatus from the outside and inside of the building, means for adjusting and regulating the relative action of said inside and outside air temperatures on these said relative amounts of air from the outside and the inside of the building, and means for conditioning the air passing through said apparatus.

2. The combination in a unit heater and ventilator apparatus of the class described, of means for admitting outside air to said apparatus through a passage controlled by dampers therein, means for passing air from the interior of the building through a passage controlled by dampers therein, a motor operatively connected to said dampers, a thermostatic device having its thermostatic element operated by the temperature of the air from the outside modified by the temperature of the air inside of the building for controlling the operation of said motor.

3. The combination in a unit heater and ventilator apparatus of the class described, of means for admitting outside air to said apparatus through a passage controlled by dampers therein, means for passing air from the interior of the building through a passage controlled by dampers therein, a motor operatively connected to said dampers, a thermostatic device controlled by the temperature of the air inside and by the temperature of the air from the outside of the building for controlling the operation of said motor, means for adjusting and regulating the relative action of said inside and outside air temperatures on said thermostatic device, and means for conditioning the air passing through said apparatus.

4. The combination in a unit heater and ventilator apparatus of the class described, of means for admitting outside air to said apparatus through a passage controlled by dampers therein, means for passing air from the interior of the building through a passage controlled by dampers therein, a motor operatively connected to said dampers, a thermostatic device controlled by the temperature of the air inside and by the temperature of the air outside of the building for controlling the operation of said motor, means for adjusting and regulating the relative action of said inside and outside air temperatures on said thermostatic device, heating means through which the air thus admitted may be passed in varying relative amounts, and a thermostatic device controlled by the temperature of the air from within the building and the temperature of the air from outside of the building for determining the amount of air passing through said heating means, and means for adjusting and regulating the relative action of said inside and outside air temperature on said thermostatic device.

5. The combination in a unit heater and ventilator apparatus of the class described, of means for admitting outside air to said apparatus through a passage controlled by dampers therein, means for passing air from the interior of the building through a passage controlled by dampers therein, a motor operatively connected to said dampers, a thermostatic device controlled by the temperature of the air outside of the building for controlling the operation of the motor, means for adjusting and regulating the action of said outside air temperatures on said thermostatic device, a by-pass in said apparatus through which a portion of the air may be passed directly into the room, heating means through which a portion of the air may be passed, an automatically operated damper for selectively controlling the passage of the air through said by-pass and heating means, and a thermostatic device controlled by the temperature of the air from within the building and the temperature of the air from outside the building for controlling the operation of said damper and means for adjusting and regulating the relative action of said inside and outside air temperatures on said thermostatic device.

6. The combination in a unit heater and ventilator apparatus of the class described, the use of means for admitting outside air to said apparatus through a damper controlled passage, means for passing air from the interior of the building through a damper controlled passage to said apparatus, a motor operatively connected to said dampers, a thermostatic device controlled by the temperature of the air from the inside and from the outside of the building for controlling the operation of said motor, means for adjusting and regulating the relative action of said inside and outside air temperatures on said thermostatic device, heating means through which the air thus admitted to the apparatus may be passed, and a thermostatic device controlled by the temperature of the air from within the building and by the temperature of the air from the outside of the building for controlling the action of said heating means, together with means for adjusting and regulating the relative action of said inside and outside air temperatures on the said thermostatic device.

7. In combination with a unit heater and ventilator apparatus for use in the heating and ventilating of a building or other space, dampers for regulating the amount of air taken into said apparatus, a motor operatively connected to said dampers and controlled by a temperature sensitive member positioned to be acted upon by the temperature of the air taken in from the room to the apparatus and air taken in from out of doors to control the proportionate amounts of air taken into the apparatus as a predetermined function of the combined temperature of the air from the room and the air from out of doors.

8. In combination with a unit heater and ventilator apparatus for use in the heating and ventilating of a building or other space, the use of a temperature sensitive member positioned to be acted upon by the temperature of the air taken into said apparatus from within the building and the temperature of the air being taken into the apparatus from out of doors to control dampers to vary the relative proportions of the air taken into said apparatus from the building and from out of doors as a combined function of the temperatures thereof.

9. In combination with a unit heater and ventilator apparatus for use in connection with the heating and ventilating of air for a building or other space, a heater and a by-pass around said heater, the use of automatically controlled dampers whereby the air passing through said apparatus may be controlled to direct the passage of any desired portion of this air through the heater and the remainder through the by-pass so as to maintain any desired temperature of the air within the building as any predetermined combined function of the temperature of the air being taken into the said apparatus from within the building and the temperature of the air being taken into the apparatus from out of doors.

PERRY WEST.